United States Patent [19]

Leiber et al.

[11] Patent Number: 4,575,160

[45] Date of Patent: Mar. 11, 1986

[54] VEHICLE WHEEL CONTROLLED ANTI-BRAKE LOCK BRAKING ARRANGEMENT

[75] Inventors: Heinz Leiber, Oberriexingen; Wolf-Dieter Jonner, Beilstein, both of Fed. Rep. of Germany

[73] Assignee: Robert Bosch GmbH, Stuttgart, Fed. Rep. of Germany

[21] Appl. No.: 620,466

[22] Filed: Jun. 14, 1984

[30] Foreign Application Priority Data

Jun. 14, 1983 [DE] Fed. Rep. of Germany ....... 3321376
Oct. 29, 1983 [DE] Fed. Rep. of Germany ....... 3339336

[51] Int. Cl.$^4$ ................................................ B60T 8/10
[52] U.S. Cl. ...................................... 303/110; 303/114
[58] Field of Search ................... 303/92, 93, 95, 100, 303/105, 110, 111, 113, 114, 116, 119

[56] References Cited

U.S. PATENT DOCUMENTS 3,999,809 12/1976 Inada et al. ...................... 303/119 X
4,093,317 6/1978 Lindemann et al. ............. 303/113 X
4,320,459 3/1982 Lindemann et al. ............. 303/105 X

*Primary Examiner*—Duane A. Reger
*Attorney, Agent, or Firm*—Frishauf, Holtz, Goodman & Woodward

[57] ABSTRACT

To provide for change in application of pressure rate, or pressure gradient, in a simplified control system, a group of shunt valves (36–39; 51, 52), which are normally open, are hydraulically connected in parallel to at least one of the brake fluid control valves (8–11; 43, 44, 45) which receive, hold, or drain pressurized brake fluid from main brake cylinders (2, 3) under command of an automatic braking system evaluation stage or unit (ABS) in accordance with sensed wheel speed, acceleration or deceleration, to apply additional pressurized brake fluid to the brake associated with the wheels. The brake fluid control valves (8–11; 43, 44, 45) include chokes, or have inherent choking action, in their hydraulic path which is bypassed by the shunt valves. Operation of the shunt valves, including a brake fluid feed control valve (12; 48) is controlled by a single electromagnet which is, in turn, controlled by the pressure within the main braking cylinders (2, 3) and/or position of the brake control pedal, so that the pressure gradient or build-up within the brake cylinders of the wheels is either directly controlled through the shunt path through the shunt valves, or through the brake fluid control valves (8–11; 43–45) under control of the ABS unit, the feed valves supplying additional pressurized brake fluid to the respective brake circuits to prevent exhaustion thereof. Preferably, the shunt valves and the feed valve are placed in a common valve block.

20 Claims, 4 Drawing Figures

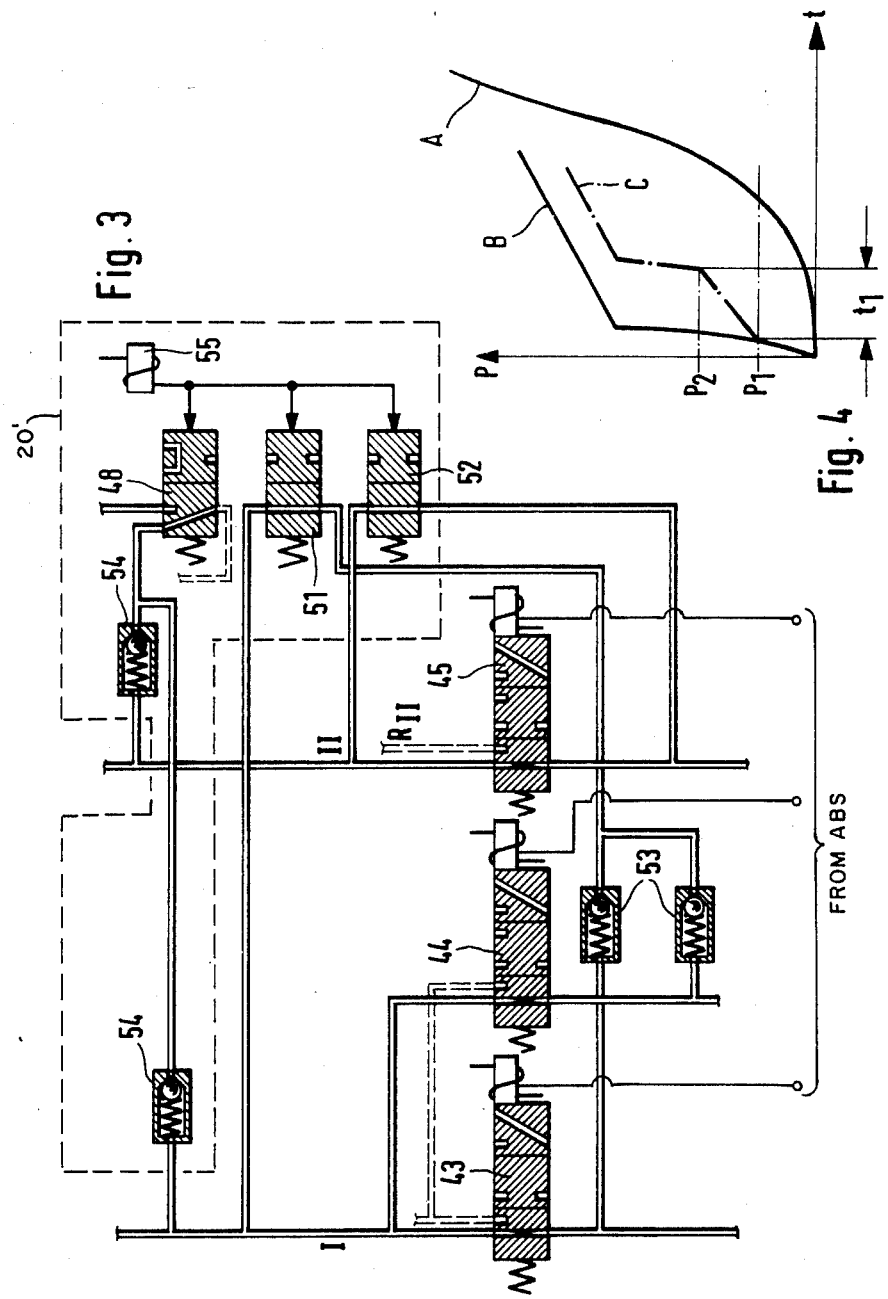

VEHICLE WHEEL CONTROLLED ANTI-BRAKE LOCK BRAKING ARRANGEMENT

Reference to related application, assigned to the assignee of the present invention, the disclosure of which is hereby incorporated by reference: U.S. Ser. No. 620,458, filed June 14, 1984, LEIBER.

The present invention relates to a vehicle wheel anti-brake lock or anti-skid system in which a group of valves are provided which, depending upon sensed deceleration, are capable of relieving braking pressure, or maintaining braking pressure constant rather than increasing it, if a certain deceleration threshold, indicative of skidding or blocking of a wheel, is sensed.

THE INVENTION

It is an object to improve a vehicle wheel anti-skid system which may be of any standard or well-known construction.

Briefly, a valve is connected in shunt to the brake fluid control valve which is operated by the anti-skid system. The shunt valve is normally open, and permits application of additional pressurized brake fluid to the brake associated with the brake fluid control valve. A feed valve, coupled to a source of pressurized brake fluid, and connected to the inlet of the respective controlled valve, permits application of additional pressurized braking fluid to prevent possible excessive loss of pressurized brake fluid from a braking circuit. A single electrically controlled, that is, electromagnetic valve, is coupled to and controlled by the automatic anti-brake lock system, of standard construction, to control, conjointly, the feed valve and the shunt valve.

The system has the advantage that only a single additional electromagnetically controlled valve is needed, while permitting change of the pressure gradient if the anti-brake lock system commands build-up of increased braking pressure.

The arrangement thus combines the use of a feed valve with a gradient control system and improves and simplifies operation of an anti-skid system with such a combination of valves.

DRAWINGS

FIG. 3 is a fragmentary diagram illustrating another embodiment; and

FIG. 4 is a graph illustrating various pressure vs. time relationships, in which the time axis is the abscissa.

DETAILED DESCRIPTION

Figure 1:
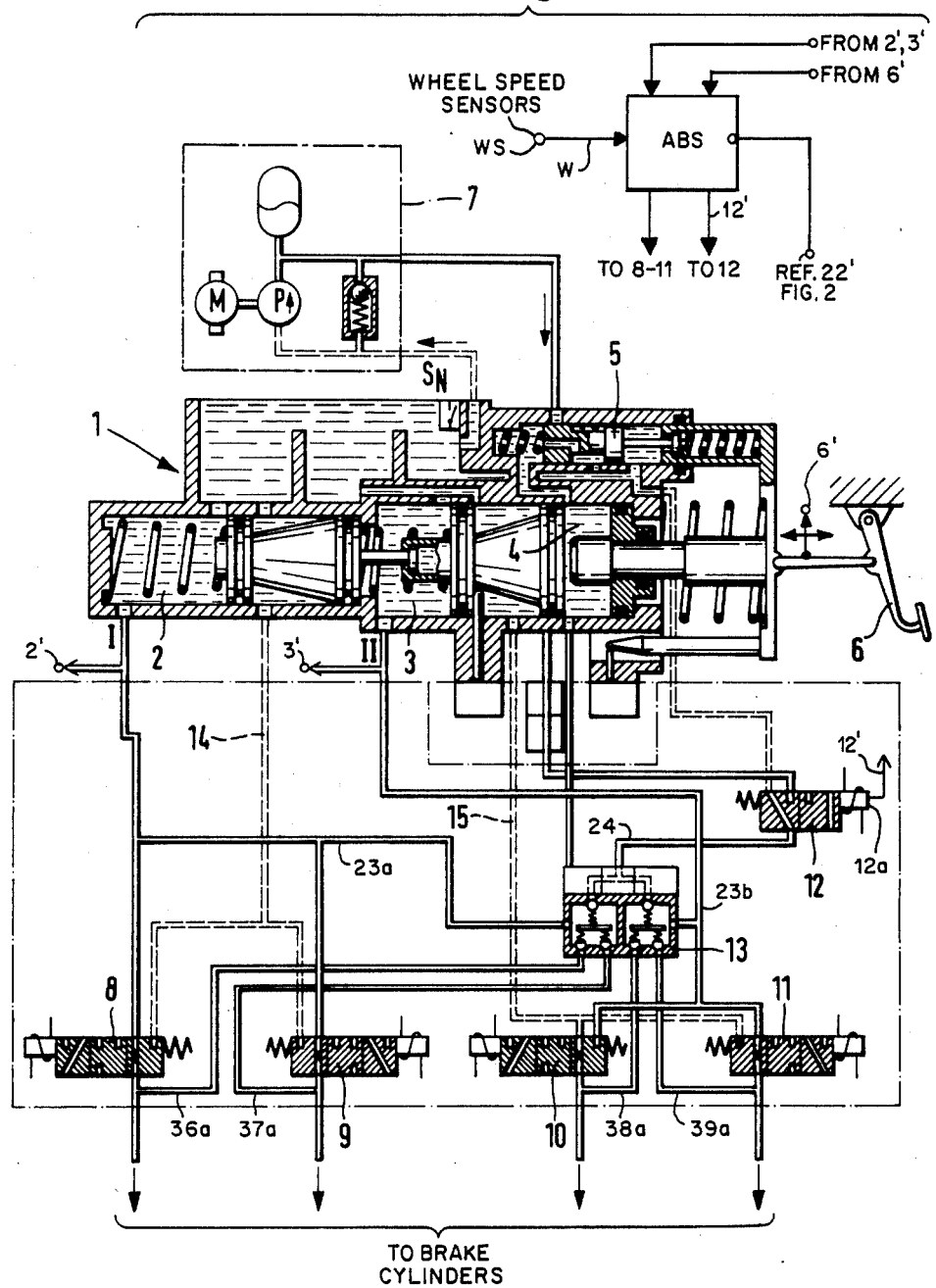
FIG. 1 is a schematic diagram of an embodiment of the present invention.

A main brake cylinder unit 1 has two main brake cylinders 2, 3 connected to respective individual braking circuits I and II. The master cylinder has a control chamber 4 for the main braking cylinders 2, 3, and a brake valve 5 operated by an operator-controlled brake pedal 6. Operation of the brake pedal 6 controls the pressure in the control chamber 4. A source of pressurized brake fluid, including a reservoir, a motor and a pump, and a check valve, provides pressurized brake fluid to the pressure chamber 4. In the drawing, the following convention has been used: Solid lines represent lines carrying pressurized brake fluid; broken lines represent fluid lines carrying unpressurized or drain-connected or return-connected hydraulic lines.

The respective brake cylinders of the wheels are not shown, and may be of any standard construction. Each one of the wheels has a control valve 8, 9 and 10, 11 associated therewith, the valves 8, 9 and 10, 11 being connected to the respective brake circuits I and II. Valves 8–11 are 3/3 valves which—as illustrated in detail only with respect to valve 11—permit braking pressure to be increased under hydraulically throttled conditions, maintained constant or steady, or dropped or drained over return lines 14, 15, respectively. The control of the respective valves 8–11 is effected by a standard anti-brake lock system ABS, which receives signals from wheel speed sensors WS. The ABS unit determines vehicle speed, acceleration and deceleration of the respective wheels, respectively, rate of acceleration and deceleration, and provides control signals to the respective valves. Additionally, the ABS system has a line 12' on which an output signal is available, as will appear.

A magnetically operated control system formed by a 3/2 valve 12 is provided, connected to a dual valve unit 13. Valve unit 13 is provided with two chambers to separate the respective fluid circuits I and II. The valve unit 13 is directly connected with the pressure chamber 4 and can be connected, additionally, with the pressure supply system 7 through the magnetic valve 12 upon opening thereof. The dual unit 13 is connected with the main braking cylinders 2, 3, respectively. The unit 13 has four outlets which are connected to the outputs of the brake pressure control valves 8–11 and, hence, to the individual brake cylinders of the wheel brakes. This places the chamber and the valve unit 13 in shunt to the respective valves 8–11 by coupling the main braking cylinders 2 and 3 through the unit 13 directly to the brake cylinders of the vehicle wheels. This condition will pertain so long as the valve unit 13 is in the position shown in FIG. 1. The valves 8–11 are bridged by a shunt path, permitting rapid increase in hydraulic brake pressure therein.

Figure 2:
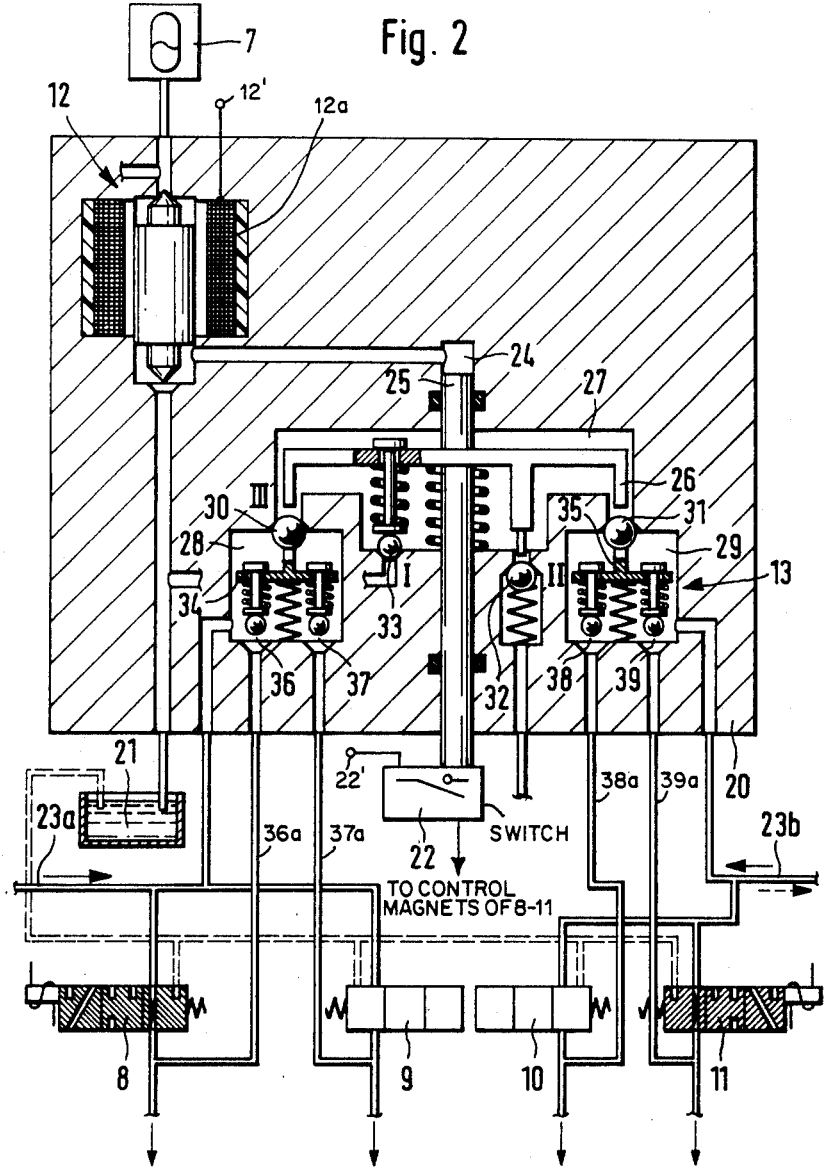
FIG. 2 is a detailed highly schematic diagram of the single control valve.

The magnetically operated valve 12 and the valve unit 13 are shown separately in FIG. 1 for ease of analysis; they can readily be combined in one structural unit, as shown in FIG. 2.

Valve 12 and valve 13 are commonly fitted in a valve block 20. FIG. 2 also shows, schematically, the valves 8–11, the pressure supply 7, and a reservoir 21 forming a pressure fluid supply. A switch 22 is provided, connected to a line 22' which is coupled to the ABS unit (FIG. 1). Connecting lines 23a and 23b extend from the main brake cylinders 2, 3 to the valves 8–11.

The 3/2 magnetic valve 12, depending on energization of the solenoid 12a thereof, through electric control line 12', connected to the ABS unit (FIG. 1), hydraulically connects either the pressure supply 7 or the drain reservoir 21 with a pressure space 24, which forms the head portion of a cylinder in which a piston 25 is operable.

The valve block 20 has three pressure chambers 27–29 which, in the position shown, are separated from each other by check valves 30, 31. The pressure chamber 27 can be connected upon opening of a valve 32 with the pressure chamber 4. The chamber 27, in the position shown, is connected to the drain reservoir 21. This connection can be closed off by a valve 33 which is connected to the drain connection of the magnetic valve 12.

Valves 30–33 are operated by operating element 26 which is coupled to the piston 25. The closing elements of the valves 30, 31 are further connected to operating elements 34, 35 within the chambers 28, 29. The operating elements carry closing balls or plugs of shunt valves 36–39. The closing elements can be shifted with respect to the operating elements 34, 35 counter the force of springs. These valves, thus, serve additionally as valves which open when a predetermined pressure differential appears in order to permit pressure at the outlets of valves 8–11 to drop. The pressure chambers 28, 29 are connected to the hydraulic lines 23a, 23b, respectively, connected to the main brake cylinders 2, 3. By shifting the operating element 26 upon movement of the piston 25 when the valve 12 permits pressurized brake fluid to enter chamber 24, valves 30–33 and 36–39 are commonly operated. Additionally, the switch 22 is operated.

System operation: Upon normal braking, all valves are in the position shown. If a tendency of a wheel to skid, that is, of a brake to block should be sensed, the 3/2 valve 12 will be operated upon control from the electric control line 12', deceleration having been sensed in the ABS unit which will provide a corresponding output signal to line 12'. This closes the shunt valves, that is, the shunt connection will be blocked, so that pressure can be built up from that point on only under throttled condition. Simultaneously, the drain valve 33 is closed, the inlet valve 32 opened, and the separating valves 30, 31 which normally separate the braking circuits I and II, will open. This places the pressure of the pressure chamber 4 to the brake control valves 8–11. These valves are controlled—as is the magnetic valve—by the evaluation circuitry within the ABS unit—in accordance with well-known criteria. Since the switch 22 is included in the control unit, valves 8–11 are controlled by the ABS unit only when the piston 25 has shifted, closing switch 22 and permitting control of the valves 8–11 through the ABS unit. Pressure fluid supplied over the valve 32 prevents, upon sensing of a tendency of the brake lock system to operate, that pressurized brake fluid will become exhausted in the main braking cylinder when pressure is dropped in the brake cylinders upon drainage of pressurized brake fluid. In accordance with the present invention, the exhaustion of pressurized brake fluid is prevented by directly controlling a single valve and, indirectly, eight valves. Only a single magnet for the entire control of all these valves is necessary. The valves will reset to normal or quiescent condition upon termination of a braking cycle, for example upon release of a brake pedal as sensed by a brake light switch. Opening of the brake light switch, for example, can be determined by a differentiator which provides a differentiated "reset" signal to reset all the valves.

It is possible to separate the connection between the main brake cylinders and the brake pressure control valves during the anti-wheel block control cycles. Such an additional connection can be provided through the valve block 20, or the valve unit 13, by placing additional valves which can be operated, for example by the element 26, or together with the valves 36–39, being closed with the valves 36–39. This arrangement will slow, stop or reverse the braking action of the main brake cylinders upon detection by the ABS antibrakelock system of a tendency of the wheels to skid or actual locking of the brake.

Embodiment of FIG. 3: Three brake control valves 43–45, which are 3/3 valves, are shown, in which the first position includes an internal throttling feature, as illustrated only in valve 45. Valves 43, 44 are arranged for one brake circuit I, and valve 45 for the brake circuit II. Return line RII is a drain line from valve 45. The valves 43, 44 are connected in shunt by valve 51; valve 45 has a shunt connection by valve 52. Check valves 53 isolate the fluid from the respective valves 43, 44, and check valves 54 isolate the fluid circuits I, II. In normal operation, the throttled paths through the valves 43, 44, 45 are bridged by the shunt valves 51, 52, to permit rapid increase of pressurized fluid. Upon tendency to sense wheel skidding or blocking, solenoid 55 is energized to shift, simultaneously, valves 48, 51, 52 to the position, not shown in FIG. 3, and permit pressure increase only through the throttled paths through valves 43, 44, 45. Simultaneous change-over of valves 51, 52 and valve 48 permits only slow increase in pressure, and valve 48 prevents exhaustion of pressure fluid in the main brake cylinders. The pressure being applied from valve 48 is, preferably, the pilot pressure from main brake cylinder 4 (FIG. 1).

Extremely rapid pressure rise is possible in both the embodiments of FIGS. 1, 2 and FIG. 3. This is particularly desirable in hydraulic systems. Upon switch-over of pressure gradient, if, for example, one of the wheels provides an output signal representative of a tendency to skid, a much slower pressure rise can be selected than in a system without switch-over of the pressure rise rate or gradient. If the valves are operated in pulsed pressure increases, then the smaller or slower rate of pressure increase or pressure gradient has the advantage that, after termination of pressure build-up, the resulting oscillation in pressure will have a substantially smaller amplitude. This substantially reduces overall noise level.

Change-over of pressure gradient can be commanded independently of a signal from the ABS unit; it may be made responsive to operating speed, or be made responsive to predetermined pressure levels. At low force transfer coefficients, a high speed of pressure rise is disadvantageous, since the valves have finite switching times, and excess pressure for a control cycle may be too great, resulting in deviation from a commanded pressure. It is desirable, for example, to change the pressure gradient, or rate of pressure change, only after a certain pressure level has been exceeded, for example of 10 bar pressure in the different systems. Curve A in FIG. 4 corresponds to a dimensioning of valves as initially referred to without change-over of pressure gradient. Curve B corresponds to the pressure curve if the system shown in FIGS. 1 and 3 is used. Control of the solenoid 55, or of the magnet valve 12, results in a gradient change-over. Curve C provides for additional improvement at low force transfer coefficients. After a predetermined pressure has been passed, or if a predetermined brake pedal position is being passed, the pressure gradient is changed over for a predetermined time period $t_1$, or until a second pressure level is reached, or a second brake pedal position. The time period $t_1$ can be readily determined by an electronic timing circuit, for example. Change-over together with switch-over of the feed valve is then commanded only later.

FIG. 2 shows the shunt lines 36a, 37a, 38a, 39a connected to and controlled by the respective valves 36–39, as well as the electrical connection line 22' between the switch 22 and the ABS unit. The ABS unit, thus, can be used to additionally sense the pressure in one or both of the cylinders II, III, as schematically shown by connecting lines 2', 3', and/or pedal position, as schematically shown by line 6' (FIG. 1), to thereby permit change-over of the operating gradient through the bypass, or under throttled condition prior to control of the valves 8-11 (FIG. 2), or 43-45 (FIG. 3) in accordance with well-known anti-skid control cycles.

Various changes and modifications may be made, and any features described herein may be used with any of the others, within the scope of the inventive concept.

We claim:

1. Vehicle wheel controlled anti-brake lock braking arrangement having
    an automatic braking system evaluation unit (ABS) coupled to receive wheel operation signals (W);
    a source (4, 7) of pressurized brake fluid;
    at least one brake fluid circuit having valve means (8-11; 43-45) controllable to transmit pressure from said source to a braking means at a first rate and said arrangement comprising, in accordance with the invention,
    means for selectively controlling the rate of pressure rise affecting at least one wheel or an axle of the vehicle including
    a shunt valve (36-39; 51, 52) which is normally open, and hydraulically connected in parallel with at least one of the brake fluid circuit valve means (8-11; 43-45) to apply pressurized brake fluid to said braking means at a second rate higher than said first rate;
    a feed valve (12, 32; 48) coupled to the source (4, 7) of pressurized brake fluid and the pressure inlet of the at least one brake fluid circuit valve means; and
    a single electromagnetic means (12a, 55) connected to and controlled by the automatic braking system evaluation unit (ABS) for controlling, conjointly, operation of the feed valve (12, 32; 48) and of the shunt valve (36-39; 51, 52).

2. Arrangement according to claim 1, including an operator-controlled brake pedal (6) controlling the pressure in a pilot chamber (4) of the main brake cylinder (1, 2, 3);
    and wherein the feed valve (12, 32; 48) is coupled to the source (4, 7) of pressurized brake fluid through said pilot chamber to apply pressurized brake fluid under the pressure within said pilot chamber.

3. Arrangement according to claim 1, wherein at least two shunt valves (36-39; 51, 52) are provided;
    and wherein at least two of said shunt valves are combined to form a dual valve unit.

4. Arrangement according to claim 2, wherein at least two shunt valves (51, 52) are provided;
    and wherein the at least two of said shunt valves are combined to form a dual valve unit.

5. Arrangement according to claim 1, wherein the single electromagnetic means (12a, 55) is electrically actuated by the automatic braking system evaluation unit (ABS) upon sensing within said unit a tendency of at least one of the wheels of the vehicle to lock or skid.

6. Arrangement according to claim 1, including a brake pressure sensing connection (2', 3') sensing brake cylinder pressure, connected to and controlling the automatic brake system evaluation unit (ABS) to provide an output signal to the single electromagnet or solenoid (12a, 55) to change the pressure gradient of hydraulic pressure being applied to the brake cylinder by controlling operation of the shunt valve to closed position, thereby blocking a shunt path through the respective shunt valve (36-39; 51, 52) when a predetermined pressure level is reached or passed.

7. Arrangement according to claim 1, including a brake pedal (6) operating the main brake valve (1, 2, 3);
    and a brake pedal position connection (6') sensing brake pedal position connected to and controlling the automatic brake system evaluation unit (ABS) to provide an output signal to the sole electromagnet or solenoid (12a, 55) to change the pressure gradient of the hydraulic pressure being applied to the brake cylinder by controlling operation of the shunt valve to closed position, thereby blocking the shunt path through the respective shunt valve, when a predetermined pedal position is reached or passed.

8. Arrangement according to claim 1, wherein the shunt valve (36-39) and the feed valve (12, 32) comprise a single unit (20);
    the feed valve includes an electromagnetically operated valve (12) having a control cylinder (24) and a control piston (25) operable therein;
    said electromagnetic means connecting the control cylinder either to the source of pressurized brake fluid (7) or to a drain connection (20, 21) to thereby correspondingly position the control piston (25);
    an operating element means (26) coupled to the control piston (25) and movable by it to conjointly operate the feed valve (32) and the shunt valve (36-39) by opening the feed valve (32) and closing the shunt valve upon energization of the single electromagnetic means (12a).

9. Arrangement according to claim 8, wherein the shunt valve (36-39) includes spring-loaded valve means acting to permit relief of pressure on the wheel brakes upon substantial pressure differential across the brake fluid circuit valve means (8-11) to relieve pressure at the wheel brakes upon occurence of said substantial pressure differential.

10. Arrangement according to claim 8, wherein said single unit (20) comprises two independent portions (28, 29), one for each of two brake fluid circuits (I, II);
    and a separating valve (30, 31) for each of said portions and connected between the feed valve (32) and a branch line to the respective brake fluid circuits, said separating valve being conjointly operated by said operating element means (26).

11. Arrangement according to claim 8, wherein the brake fluid circuit valve means includes a fluid control valve means controllable to operate in any of the following modes
    (1) increase of brake fluid pressure affecting at least one wheel or an axle of the vehicle;
    (2) drainage of brake fluid to drop brake fluid pressure affecting at least one wheel or an axle of the vehicle,
    said arrangement further including a switch means (22) operated by the operating element means (26) and connected to the automatic brake system evaluation unit (ABS) to permit control of the brake fluid control valve means (8-11) only after the operating element has shifted under control of pressurized brake fluid applied to the control piston (25) by the feed valve (12).

12. Arrangement according to claim 10, wherein the feed valve, the shunt valve, the separating valve, and hydraulic connections between said valves are retained within said single unit (20).

13. Arrangement according to claim 8, wherein the single unit includes three chambers (27, 28, 29),
   a first chamber (27) being connected via the feed valve (32) with the source of pressurized fluid;
   and a second and a third chamber (28, 29) being respectively connected via a separating valve (30, 31) with said first chamber (27), and the second and third chambers (28, 29) include outlets leading to the wheel brakes within which the shunt valves (36, 37; 38, 39) are included so as to be capable of closing said outlets;
   and a connection (23a, 23b) from said single unit (20) to the respective fluid circuits emanating from a main brake cylinder (2, 3).

14. Arrangement according to claim 13, further including an outlet valve (33) connecting the first chamber (27) with a drain or pressureless return line (20, 21), the outlet valve (33) being coupled to the operating element (26) and being operable to a closing direction in advance of operating of any of the other valves upon movement of the control piston (25).

15. Arrangement according to claim 1, further including a hydraulic throttling means connected in the fluid path between a main brake cylinder (1, 2, 3) and its respective brake fluid circuit valve means (8-11), the shunt valve (36-39; 51, 52) being in parallel with said hydraulic throttling means.

16. Arrangement according to claim 15, including a brake operation sensing means (2', 3'; 6') coupled to and controlling operation of the single electromagnetic means (12a, 55) to close the shunt path through the shunt valves (36-39; 51, 52) and thus permit application of pressurized brake fluid to the brake cylinders of the respective wheels only through said hydraulic throttling means from the brake cylinders (2, 3) to the respective brake fluid control means (8-11).

17. Arrangement according to claim 16, wherein the feed valve (12; 48) is connected to supply pressurized brake fluid to the brake fluid control means (8-11) in advance of the hydraulic throttle or choke for application of said pressurized fluid through the brake fluid valve control means under throttled conditions.

18. Arrangement according to claim 5, further including a common valve block a valve element within the common valve block (13, 20) connected in the connection between at least one of the main brake cylinders (2, 3) and the associated brake fluid valve control means (8-11; 43, 44, 45) which closes upon operation of the operating element (25) if the automatic braking system evaluation unit (ABS) senses a tendency of at least one of the wheels of the vehicle to skid or block.

19. Arrangement according to claim 1, wherein the brake fluid circuit valve means includes a fluid control valve means controllable to operate in at least two of the following modes:
   (1) increase of brake fluid pressure effecting at least one wheel or an axle of the vehicle;
   (2) drainage of brake fluid to drop brake fluid pressure affecting at least one wheel or an axle of the vehicle.

20. Arrangement according to claim 1, wherein the single electromagnetic means comprises a single electromagnet or solenoid, directly connected to operate at least one of the shunt valves (51, 52) and the feed valve (48).

* * * * *